(12) United States Patent
Smaragdis

(10) Patent No.: US 9,047,867 B2
(45) Date of Patent: *Jun. 2, 2015

(54) SYSTEMS AND METHODS FOR CONCURRENT SIGNAL RECOGNITION

(75) Inventor: Paris Smaragdis, Urbana, IL (US)

(73) Assignee: Adobe Systems Incorporated, San Jose, CA (US)

(*) Notice: Subject to any disclaimer, the term of this patent is extended or adjusted under 35 U.S.C. 154(b) by 715 days.

This patent is subject to a terminal disclaimer.

(21) Appl. No.: 13/031,353

(22) Filed: Feb. 21, 2011

(65) Prior Publication Data

US 2013/0132082 A1    May 23, 2013

(51) Int. Cl.
| | | |
|---|---|---|
| G10L 15/00 | (2013.01) | |
| G10L 15/14 | (2006.01) | |
| G06F 3/048 | (2013.01) | |
| G06F 15/18 | (2006.01) | |
| G10L 15/20 | (2006.01) | |

(52) U.S. Cl.
CPC ............... *G10L 15/142* (2013.01); *G10L 15/20* (2013.01)

(58) Field of Classification Search
USPC ................. 704/240, 238, 243, 256, 234, 235; 715/767; 706/20
See application file for complete search history.

(56) References Cited

U.S. PATENT DOCUMENTS

| | | | |
|---|---|---|---|
| 5,345,536 A * | 9/1994 | Hoshimi et al. ............. 704/243 |
| 6,493,667 B1 * | 12/2002 | de Souza et al. ............. 704/240 |
| 6,799,170 B2 * | 9/2004 | Lee et al. ........................ 706/20 |
| 7,584,102 B2 | 9/2009 | Hwang et al. |
| 7,664,640 B2 | 2/2010 | Webber |
| 7,664,643 B2 | 2/2010 | Gopinath et al. |
| 7,899,669 B2 * | 3/2011 | Gadbois ........................ 704/235 |
| 8,010,347 B2 | 8/2011 | Ricci et al. |
| 8,036,884 B2 | 10/2011 | Lam et al. |
| 8,112,272 B2 * | 2/2012 | Nagahama et al. ........... 704/226 |
| 8,150,688 B2 * | 4/2012 | Iwasawa ...................... 704/233 |
| 8,386,251 B2 * | 2/2013 | Strom et al. .................. 704/246 |
| 8,452,596 B2 * | 5/2013 | Tani et al. ..................... 704/247 |
| 8,521,518 B2 | 8/2013 | Jung et al. |
| 8,554,553 B2 | 10/2013 | Mysore et al. |
| 8,843,364 B2 | 9/2014 | Mysore et al. |
| 2001/0037195 A1 | 11/2001 | Acero et al. |
| 2002/0135618 A1 * | 9/2002 | Maes et al. ................... 345/767 |
| 2002/0169600 A1 | 11/2002 | Busayapongchai et al. |
| 2004/0107100 A1 * | 6/2004 | Lu et al. ....................... 704/238 |

(Continued)

OTHER PUBLICATIONS

M.N. Schmidt and R.K. Olsson, Single-channel speech separation using sparse non-negative matrix factorization, Proceedings of Interspeech, 2006, Pittsburgh.*

(Continued)

*Primary Examiner* — Pierre-Louis Desir
*Assistant Examiner* — Neeraj Sharma
(74) *Attorney, Agent, or Firm* — Wolfe-SBMC

(57) ABSTRACT

Methods and systems for recognition of concurrent, superimposed, or otherwise overlapping signals are described. A Markov Selection Model is introduced that, together with probabilistic decomposition methods, enable recognition of simultaneously emitted signals from various sources. For example, a signal mixture may include overlapping speech from different persons. In some instances, recognition may be performed without the need to separate signals or sources. As such, some of the techniques described herein may be useful in automatic transcription, noise reduction, teaching, electronic games, audio search and retrieval, medical and scientific applications, etc.

15 Claims, 10 Drawing Sheets

(56) References Cited

U.S. PATENT DOCUMENTS

| | | | |
|---|---|---|---|
| 2004/0122672 A1* | 6/2004 | Bonastre et al. | 704/256 |
| 2004/0186717 A1 | 9/2004 | Savic et al. | |
| 2004/0199384 A1* | 10/2004 | Hong | 704/233 |
| 2006/0178887 A1 | 8/2006 | Webber | |
| 2007/0100623 A1 | 5/2007 | Hentschel et al. | |
| 2008/0052074 A1 | 2/2008 | Gopinath et al. | |
| 2008/0059177 A1* | 3/2008 | Poirier et al. | 704/251 |
| 2008/0120108 A1* | 5/2008 | Soong et al. | 704/254 |
| 2009/0006038 A1 | 1/2009 | Jojic et al. | |
| 2009/0018828 A1* | 1/2009 | Nakadai et al. | 704/234 |
| 2010/0053347 A1 | 3/2010 | Agarwala et al. | |
| 2010/0082340 A1 | 4/2010 | Nakadai et al. | |
| 2010/0195770 A1 | 8/2010 | Ricci et al. | |
| 2010/0198598 A1* | 8/2010 | Herbig et al. | 704/240 |
| 2011/0125496 A1 | 5/2011 | Asakawa et al. | |
| 2013/0132085 A1 | 5/2013 | Mysore et al. | |
| 2013/0226558 A1 | 8/2013 | Mysore | |
| 2013/0226858 A1 | 8/2013 | Smaragdis | |

OTHER PUBLICATIONS

Factorial scaled Hidden Markov Model for Polyphonic Audio Representation and Source Separation by Alexey Ozerov, Cedric Fevotte and Maurice Charbit, as presented in the 2009 IEEE Workshop on Applications of Signal Processing to Audio and Acoustics Oct. 18-21, 2009, New Paltz, NY.*

Non-negative Hidden Markov Modeling of Audio with Application to Source Separation (Conference Paper); Authors: Mysore, G. J., P. Smaragdis, and B. Raj; International Conference on Latent Variable Analysis and Signal Separation (LVA / ICA); Publicaton Date: Sep. 2010.

L. Benaroya, F. Bimbot, and R. Gribonval. Audio source separation with a single sensor. IEEE TASLP, 14(1), Jan. 2006.

Z. Ghahramani and M. Jordan. Factorial hidden Markov models. Machine Learning, 1997.

J. R. Hershey, T. Kristjansson, S. Rennie, and P. A. Olsen. Single channel speech separation using factorial dynamics. In NIPS, 2007.

A. Ozerov, C. Fevotte, and M. Charbit. Factorial scaled hidden markov model for polyphonic audio representation and source separation. In WASPAA, Oct. 2009.

L. R. Rabiner. A tutorial on hidden markov models and selected applications in speech recognition. Proceedings of the IEEE, 77(2):257-286, 1989.

P. Smaragdis and J. C. Brown. Non-negative matrix factorization for polyphonic music transcription. In WASPAA, 2003.

P. Smaragdis, B. Raj, and M. Shashanka. Probabilistic latent variable model for acoustic modeling. In Advances in models for acoustic processing, NIPS, 2006.

E. Vincent, R. Gribonval, and C. F'evotte. Performance measurement in blind audio source separation. IEEE TASLP, 14(4), Jul. 2006.

T. Virtanen. Speech recognition using factorial hidden Markov models for separation in the feature space. In Proceedings of Interspeech, 2006.

The Markov selection model for concurrent speech recognition; Authors: Smaragdis, P.; Raj, B.; 2010 IEEE International Workshop on Machine Learning for Signal Processing (MLSP), pp. 214-219; Issue date: Aug. 29, 2010-Sep. 1, 2010.

Raj, B., P. Smaragdis. Latent Variable Decomposition of Spectrograms for Single Channel Speaker Separation, in 2005 IEEE Workshop on Applications of Signal Processing to Audio and Acoustics (WASPAA 2005).

Virtanen, T. and A. T. Cemgil. Mixtures of Gamma Priors for Non-Negative Matrix Factorization Based Speech Separation, in 8th International Conference on Independent Component Analysis and Signal Separation (ICA 2009).

Smaragdis, P., M. Shashanka, and B. Raj. A sparse nonparametric approach for single channel separation of known sounds, Neural Information Processing Systems (NIPS) 2009.

Hofmann, T. Probabilistic Latent Semantic Indexing, in 1999 ACM SIGIR Special Interest Group on Information Retrieval Conference (SIGIR 1999).

Lee D.D., and H.S. Seung. Learning the parts of objects by non-negative matrix factorization. Nature 401, 1999.

Bourlard, H. and N. Morgan, Hybrid HMM/ANN systems for speech recognition: Overview and new research directions, LNCS, Springer Berlin, vol. 1387, 1998, pp. 389-417.

Rabiner, L.R. and B. H. Juang. An introduction to hidden Markov models. IEEE Acoustics, Speech and Signal Processing (ASSP) Magazine, 3(1):4-16, 1986.

Mysore, G. J. A Non-negative Framework for Joint Modeling of Spectral Structure and Temporal Dynamics in Sound Mixtures, Thesis, published on Jun. 2010, Stanford University.

"Non-Final Office Action", U.S. Appl. No. 13/031,357, (Jan. 10, 2013), 15 pages.

"Singular value decomposition", Retrieved from <http:/ /en.wil<ipedia.org/wiki/Singularvalue_decomposition> on Nov. 29, 2010, 14 pages.

U.S. Appl. No. 12/954,445, filed Nov. 24, 2010, 75 pages.

U.S. Appl. No. 13/031,353, filed Feb. 21, 2011, 47 pages.

U.S. Appl. No. 13/031,357, filed Feb. 21, 2011, 53 pages.

Avidan, et al., "Seam Carving for Content-Aware Image Resizing", *ACM Transactions on Graphics 2007*, (Jul. 2007), 9 pages.

Benaroya, Laurent et al., "Audio Source Separation with a Single Sensor", *IEEE TASLP*, 14(1), (Jan. 2006), pp. 191-199

Bhat, et al., "Using Photographs to Enhance Videos of a Static Scene", *Rendering Techniques 2007: 18th Eurographics Workshop on Rendering*, 327-338, (2007), 12 pages.

Bourlard, Herve et al., "Hybrid HMM/ANN Systems for Speech Recognition: Overview and New Research Directions", *LNCS, Springer Berlin*, vol. 1387, (1998), 29 pages.

Brand, Matthew "Incremental singular value decomposition of uncertain data with missing values", *7th European Conference on Computer Vision (ECCV 2002)*, 707-720., (May 2002), 14 pages.

Buchanan, et al., "Damped Newton Algorithms for Matrix Factorization with MIssing Data", *IEEE Computer Society Conference on Computer Vision and Pattern Recognition*, 316-322, (2005), 7 pages.

Buehler, et al., "Non-Metric Image-Based Rendering for Video Stabilization", *2001 Conference on Computer Vision and Pattern Recognition (CVPR 2001)*, 609-614., (2001), 6 pages.

Chen, et al., "Capturing Intention-based Full-Frame Video Stabilization", *2008, Computer Graphics Forum 27*, 7, 1805-1814., (2008), 10 pages.

Chen, Pei "Optimization algorithms on subspaces: Revisiting missing data problem in low-rank matrix", *2008 Int. J. Comput. Vision 80*, 1, 125-142., 40 pages.

Davison, et al., "MonoSLAM: Real-Time Single Camera SLAM", *2007, IEEE Transactions on Pattern Analysis and Machine Intelligence 26*, 6, 1052-1067., (Jun. 2007), 16 pages.

Fitzgibbon, et al., "Image-Based Rendering Using Image-Based Priors", *2005, International Journal of Computer Vision 63*, 2 (July), 141-151, (2005), 11 pages.

Gal, et al., "Feature-aware texturing", School of Computer Science, Tel Aviv University, Israel; Draft version. The original paper appeared in *EGSR '06 proceedings.*, (2006), 7 pages.

Ghahramani, Zoubin et al., "Factorial Hidden Markov Models", *Machine Learning 29*, (1997), 29 pages.

Goh, et al., "Segmenting Motions of Different Types by Unsupervised Manifold Clustering", *2007, IEEE Computer Vision and Pattern Recognition (CVPR)*, 1-6., (2007), 6 pages.

Hershey, John R., et al., "Single Channel Speech Separation Using Factorial Dynamics", *NIPS*, (2007), 8 pages.

Hershey, John R., et al., "Super-Human Multi-Talker Speech Recognition: A Graphical Modeling Approach", Elsevier Ltd., *Computer Speech and Language 24*,. (2008), 22 pages.

Hofmann, Thomas "Probabilistic Latent Semantic Indexing", *ACM SIGIR Special Interest Group on Information Retrieval Conference (SIGIR)*, (1999), 8 pages.

Igarashi, et al., "As-Rigid-As-Possible Shape Manipulation", *ACM Transactions on Graphics 2005*, (2005), 8 pages.

(56) References Cited

OTHER PUBLICATIONS

Irani, Michal "Multi-Frame Correspondence Estimation Using Subspace Constraints", *2002, International Journal of Computer Vision 48*, 1, 39-51., (2002), 22 pages.

Lee, Daniel D., et al., "Learning the Parts of Objects by Non-Negative Matrix Factorization", *Nature* vol. 401, (Oct. 21, 1999), pp. 788-791.

Lee, et al., "General contruction of Time-Domain Filters for Orientation Data", *2002, IEEE Transactions on Visualization and Computer Graphics 8*, 2 (April-June), 119-128., (2002), 10 pages.

Lee, et al., "Video Stabilization using Robust Feature Trajectories", *2009, IEEE ICCV.*, (2009), 8 pages.

Lui, et al., "Content-Preserving Warps for 3D Video Stabilization", *2009, ACM Transactions on Graphics (Poceedings of SIGGRAPH 2009)* 28, 3 (Aug.), Article No. 44., (2009), 9 pages.

Matsuhita, "Full-frame Video Stabilization", *2006, IEEE Transactions on Pattern Analysis and Machine Intelligence 28*, 7, 1150-1163., (2006), 8 pages.

Morimoto, et al., "Evaluation of Image Stabilization Algorithms", *1997, DARPA Image Understanding Workshop DARPA97*, 295-302., (1997), 4 Pages.

Mysore, Gautham J., "A Non-Negative Framework for Joint Modeling of Spectral Structure and Temporal Dynamics in Sound Mixtures", *Doctoral Dissertation*, (Jun. 2010), 157 pages.

Mysore, Gautham J., et al., "Non-Negative Hidden Markov Modeling of Audio with Application to Source Separation", *International Conference on Latent Variable Analysis and Signal Separation (LVA/ICA)*, (Sep. 2010), 8 pages.

Nister, et al., "Visual Odometry", *2004, IEEE Computer Vision nd Pattern Recognition (CVPR)*, 652-659., (2004), 8 pages.

Ozerov, Alexey et al., "Factorial Scaled Hidden Markov Model for Polyphonic Audio Representation and Source Separation", *IEEE Workshop on Applications of Signal Processing to Audio and Acoustics*, (Oct. 18, 2009), pp. 121-124.

Rabiner, et al., "A Introduction to Hidden Markov Models", *IEEE Acoustics, Speech and Signal Processing (ASSP) Magazine*, 3(1), (Jan. 1986), pp. 4-16.

Rabiner, Lawrence R., "A Tutorial on Hidden Markov Models and Selected Applications in Speech Recognition", *Proceedings of the IEEE*, 77(2), (Feb. 1989), pp. 257-286.

Raj, Bhiksha et al., "Latent Variable Decomposition of Spectrograms for Single Channel Speaker Separation", *WASPAA 2005*, (2005), 6 pages.

Shashanka, Madhusudana V., et al., "Sparse Overcomplete Decomposition for Single Channel Speaker Separation", *Acoustics Speech and Signal Processing IEEE International Conference on ICASSP*, vol. 2, Publisher: IEEE, pp. II-641-II-644,(2007), 4 pages.

Shi, et al., "Good Features to Track", *1994, IEEE Conference on Computer Vision and Patern Recognition*, 593-600., (1994), 8 pages.

Sinha, et al., "GPU-based Video Feature Tracking and Matching", *Workshop on Edge Computing Using New Commodity Architectures (EDGE 2006).*, (2006), 15 pages.

Smaragdis, Paris "A Probabilistic Latent Variable Model for Acoustic Modeling", *NIPS*, (2006), 6 pages.

Smaragdis, Paris "Supervised and Semi-Supervised Separation of Sounds from Single-Channel Mixtures", *ICA '07 Proceedings of the 7th international conference on Independent component analysis and signal separation*, (2007), 8 pages.

Smaragdis, Paris et al., "A Sparse Non-Parametric Approach for Single Channel Separation of Known Sounds", *Neural Information Processing Systems (NIPS*, (2009), 9 pages.

Smaragdis, Paris et al., "Non-Negative Matrix Factorization Polyphonic Music Transcription", *IEEE Workshop on Applications of Signal Processing to Audio and Acoustics*, (Oct. 19, 2003), pp. 177-180.

Smaradis, Paris et al., "The Markov Selection Model for Concurrent Speech Recognition", *Machine learning for Signal Processing (MLSP), 2010 IEEE International Workshop*, (2010), 6 pages.

Tomasi, et al., "Shape and motion from image streams: A factorization method", *1992, Int. J. Comput. Vision 9*, 2,137-154., (1992), 8 pages.

Torr, et al., "The Problem of Degeneracy in Structure and Motion Recovery from Uncalibrated Image Sequences", *1999, International Journal of Computer Vision 32*, 1, 27-44., (1999), 20 pages.

Vidal, et al., "Multiframe Motion Segementation with Missing Data Using PowerFactorization and GPCA", *2008, Int. J. Comput. Vision 79*, 1, 85-105., (2008), 21 pages.

Vincent, Emmanuel et al., "Performance Measurement in Blind Audio Source Separation", *IEEE TASLP*, 14(4), (Jul. 2006), 9 pages.

Virtanen, Tuomas "Speech Recognition Using Factorial Hidden Markov Models for Separation in the Feature Space", *Interspeech 2006*, (Sep. 17, 2006), 4 pages.

Virtanen, Tuomas et al., "Mixtures of Gamma Priors for Non-Negative Matrix Factorization Based Speech Separation", *8th International Conference on Independent Component Analysis and Signal Separation (ICA 2009)*, (2009), 8 pages.

Zhang, et al., "Video stabilization based on a 3D perspective camera model", Zhang, G., Hua, W., Qin, X., Shao, Y., and Bao, H. 2009. *The Visual Computer 25*, 11, 997-1 008., (2009), 12 pages.

"Notice of Allowance", U.S. Appl. No. 13/031,357, (Jun. 28, 2013), 9 pages.

"Corrected Notice of Allowance", U.S. Appl. No. 13/031,357, (Sep. 9, 2013), 2 pages.

"Non-Final Office Action", U.S. Appl. No. 13/408,934, (Nov. 21, 2013), 19 pages.

"Final Office Action", U.S. Appl. No. 13/408,934, Apr. 25, 2014, 9 pages.

"Notice of Allowance", U.S. Appl. No. 13/408,934, Jun. 9, 2014, 8 pages.

\* cited by examiner

1000

```
┌─────────────────────────────────────────────┐
│  Receiving a sound mixture including a first sound
│  emitted by a first source and a second sound emitted
│  by a second source, wherein, within the sound mixture,
│     the first and second sounds overlap in time
│                     1005
└─────────────────────────────────────────────┘
                        │
                        ▼
┌─────────────────────────────────────────────┐
│       Recognizing the first sound within the
│       sound mixture without separating the
│           first sound from the second sound
│                     1010
└─────────────────────────────────────────────┘
```

*FIG. 10*

SYSTEMS AND METHODS FOR CONCURRENT SIGNAL RECOGNITION

BACKGROUND

This specification relates to signal processing, and, more particularly, to systems and methods for concurrent signal recognition.

In most applications, any given signal may be treated as a mixture of signals from various sources. In the field of audio processing, for example, recorded music typically includes a mixture of overlapping parts played with different instruments. Also, in social environments, multiple people often tend to speak concurrently—referred to as the "cocktail party effect." In fact, even signals from so-called single sources can actually be modeled a mixture of signal and noise.

Recognition of concurrent, superimposed, or otherwise overlapping signals is a significantly hard task. Current models for signal recognition cannot be easily extended to deal with additive interference, and often need to be complemented with a source separation algorithm that preprocesses the data before recognition takes place. This is often a risky combination insofar because the output of a separation algorithm is not always guaranteed to be recognizable—at least not by typical recognition systems.

A different temporally-sensitive approach characterizes signals from concurrent sources by Hidden Markov Models (HMMs). The sum of the speech is then characterized by a factorial HMM, which is essentially a product of the HMMs representing the individual sources. Inference can be run on the factorial HMM to determine what was emitted by individual sources. Still, this approach involves source separation and computationally intensive operations.

SUMMARY

The present specification is related to systems and methods for the recognition of concurrent, superimposed, or otherwise overlapping signals. In some embodiments, methods and systems described herein provide a Markov Selection Model that is capable of recognizing simultaneously emitted signals from different sources. The recognition may be performed without the need to separate signals or sources, thus having a low computational complexity. Accordingly, these techniques may be useful in automatic transcription, noise reduction, teaching, electronic games, audio search and retrieval, medical and scientific applications, etc.

For example, an illustrative embodiment may include a "training" stage followed by an "application" or "evaluation" stage. In the training stage, a method may process a signal sample from a source. The signal sample may be pre-recorded, in which case the training stage may be performed "offline." Additionally or alternatively, the sound sample may be a portion of a "live" occurrence; thus allowing the training stage to take place "online" or in "real-time."

In some embodiments, a training method may derive parameters for a Markov Selection Model for each signal sample of each source. For example, in the case of speech, each model may represent a word or an utterance spoken by a person. Moreover, each model may include spectral dictionaries, and each spectral dictionary may have two or more spectral components such that the sound may be represented by a linear combination of spectral components.

In an application or evaluation stage, a method may receive a mixed signal such as a mixture of sounds from different sources. In the case of speech, at least a portion of the sound mixture may include concurrently spoken utterances from different persons. The method may combine all spectral vectors and calculate mixture weights for each of the spectral vectors based on the sound mixture. Once the mixture weights for each spectral vector are known, the method may calculate the likelihood that each model expresses an utterance in the sound mixture. Furthermore, the method may select models with highest likelihood of representation at a given time. In this manner, sources corresponding to selected models may be identified without having been separated.

BRIEF DESCRIPTION OF THE DRAWINGS

FIG. 10 is a flowchart of yet another method for recognizing concurrent sounds according to some embodiments.

Figure 1:
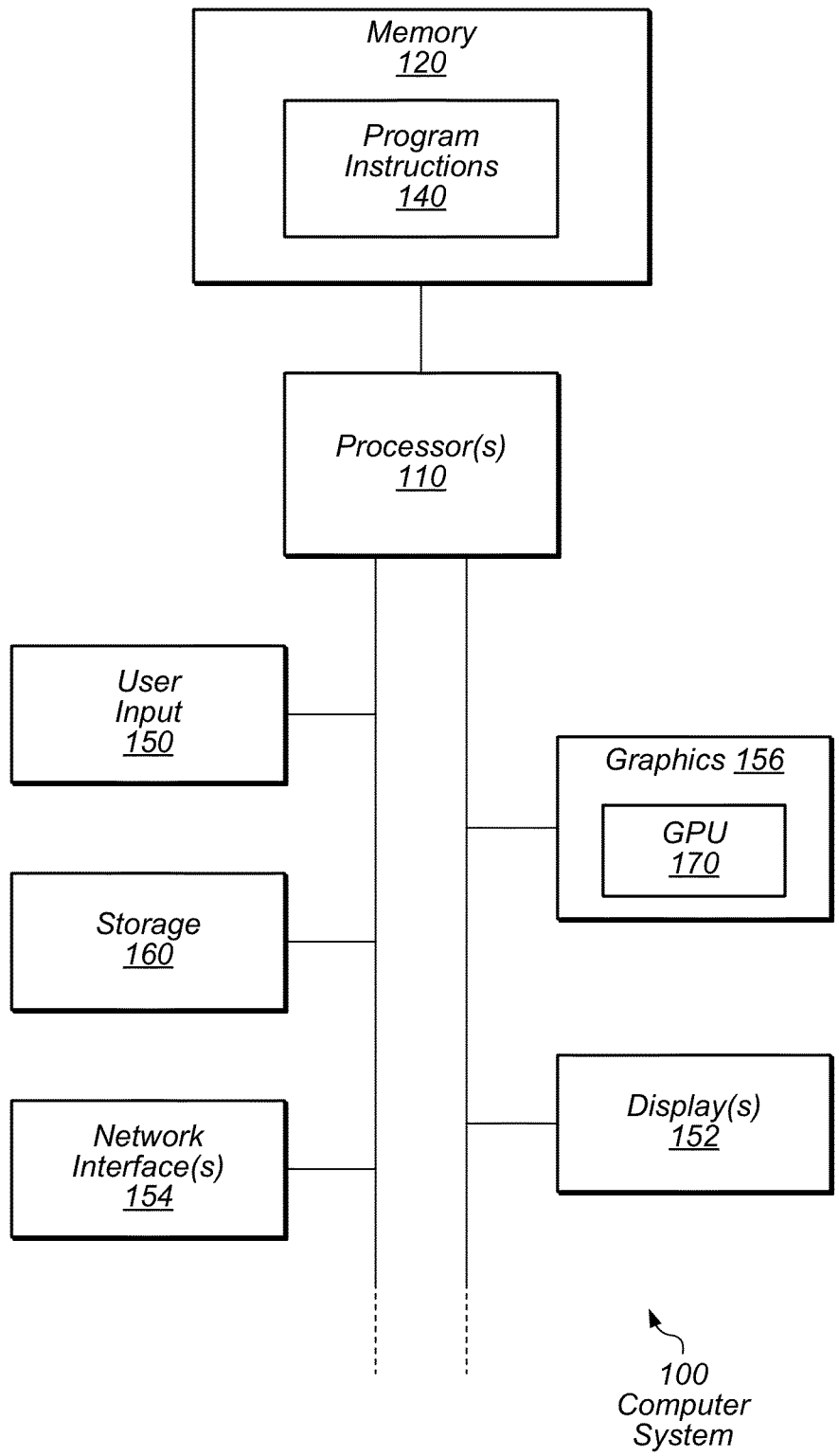
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Introduction

This specification first presents an illustrative computer system or device as well as an illustrative signal analysis module that may implement certain embodiments of methods and systems disclosed herein. The specification also discusses an additive model of various signal sources. Then, the specification introduces a Markov Selection Model that, together with probabilistic decomposition methods, may enable recognition of additive signal mixtures without the need to perform source separation. The specification goes on to discuss signal mixtures and describes illustrative methods that explain some of the concepts described herein. Lastly, the specification discusses the results of various experiments.

In some embodiments, the techniques described herein may be used in music processing, source extraction, noise reduction, teaching, automatic transcription, electronic games, audio search and retrieval, medical and scientific applications, etc. Although certain embodiments and applications discussed herein are in the field of audio processing, and particularly in the field of speech recognition, it should be noted that these techniques may be similarly applied in any other field where there may be concurrent, superimposed, or otherwise overlapping signals.

For example, some of the techniques described herein may be applicable to electromagnetic signals that are processed in various medical applications (e.g., an electrocardiogram of a mother's heartbeat mixed with the fetus's, neural signals from a brain scan with multiple superimposed actions, etc.). Further, these techniques may also be applicable to various fields of engineering (e.g., signal readings from accelerometer in a jet or car engine, etc.).

Throughout the specification, the term "signal" may refer to a physical signal (such as an acoustic or electromagnetic signal) and/or to a representation of a physical signal. In some embodiments, a signal may be recorded in any suitable tangible medium and in any suitable format. For example, a physical signal may be digitized, recorded, and stored in computer memory. The recorded signal may be compressed with commonly used compression algorithms. Typical formats for music or audio files may include WAV, OGG, AIFF, RAW, AU, AAC, MP4, MP3, WMA, RA, etc.

The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall, enclosure, or electromagnetic field. Moreover, in some cases two different entities of the same type—e.g., two different pianos—may be considered to be the same "source" for modeling purposes.

The term "mixed signal" or, in the particular case of audio, "sound mixture," refers to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a "live" signal, for example, from a live musical performance or the like. Moreover, in some cases, even so-called "single sources" may be modeled as producing a "mixed signal" as mixture of signal (e.g., sound) and noise.

In various embodiments, a goal-seeking or optimization process (such as, for example, an operation for determining an "optimal weight distribution" or the like) may or may not always guarantee convergence to an absolute solution. For example, an optimization process may exhaustively evaluate a solution space to ensure that the identified solution is the best available. Alternatively, an optimization process may employ heuristic or probabilistic techniques that provide a bounded confidence interval or other measure of the quality of a solution. For example, an optimization process may be designed to produce a solution that is within at least some percentage of an optimal solution, to produce a solution that has some bounded probability of being the optimal solution, or any suitable combination of these or other techniques.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A Computer System or Device

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In an embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In an embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of, various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

A Signal Analysis Module

Figure 2:
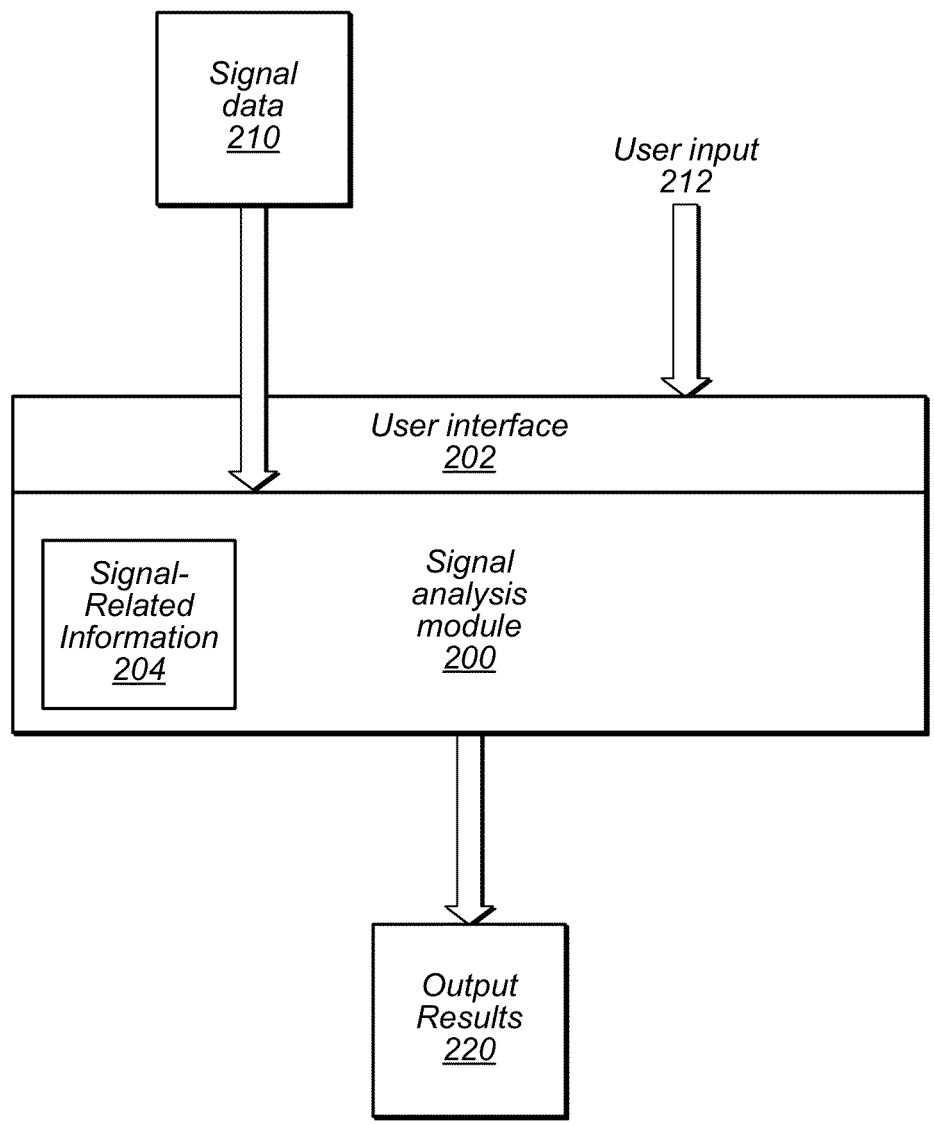
FIG. 2 is a block diagram of an illustrative signal analysis module according to some embodiments.

In some embodiments, a signal analysis module may be implemented by processor-executable instructions (e.g., instructions 140) stored on a medium such as memory 120 and/or storage device 160. FIG. 2 shows an illustrative signal analysis module that may enable certain embodiments disclosed herein. In an embodiment, module 200 may provide a user interface 202 that includes one or more user interface elements via which a user may initiate, interact with, direct, and/or control the method performed by module 200. Module 200 may be operable to obtain digital signal data for a digital signal 210, receive user input 212 regarding the signal data, analyze the signal data and/or the input, and output analysis results for the signal data 220. In an embodiment, the module may include or have access to additional or auxiliary signal-related information 204—e.g., a collection of representative signals, model parameters, etc.

Signal analysis module 200 may be provided as a stand-alone application or as a module of, or plug-in for, a signal processing application. Examples of types of applications in which embodiments of module 200 may be used may include, but are not limited to, signal (including sound) analysis, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Specific examples of applications in which embodiments may be implemented include, but are not limited to, Adobe® Soundbooth® and Adobe® Audition®. Module 200 may also be used to display, manipulate, modify, classify, and/or store signals, for example to a memory medium such as a storage device or storage medium.

Additive Models of Signals

In some embodiments, signal analysis module 200 may implement an additive signal model such as described in this section. Source separation methods typically use prior knowledge of the sources in a mixture. A common scenario may involve two "speakers" a and b, training recordings $x^a(t)$ and $x^b(t)$, and a mixture $m(t)=y^a(t)+y^b(t)$. Usually, the goal of a source separation method is to use the information extracted from $x^a(t)$ and $x^b(t)$ to estimate $y^a(t)$ and $y^b(t)$ by observing only m(t). One way to perform this task is to use non-negative spectrum factorization. This section describes a probabilistic version of such method, which allows later incorporation into a Markov model.

Specifically, given the scenario above, the spectral magnitude of the observed signals may be extracted at regularly sampled analysis frames:

$$X_\tau(f) \propto \|DFT(x(T(\tau-1)+1,\ldots,T_\tau))\| \quad \text{Equation 1}$$

where T is the size of the analysis frame chosen.

Equation 1 thus yields $X_\tau^a|$ and $X_\tau^b$, that is, the magnitude spectra for signals from speakers a and b. Magnitude spectra may be modeled as histograms drawn from a mixture of multinomial distributions, which leads to the following latent variable model:

$$X_\tau(f) \sim \sum_z^M P(f\mid z)P_\tau(z) \quad \text{Equation 2}$$

where the symbol "~" represents a drawing from a distribution, P(f|z) represents the $z^{th}$ component multinomial, $P_\tau(z)$ is the probability with which it is mixed to produce $X_\tau$ (the magnitude spectrum vector for the $\tau^{th}$ analysis frame), and M is the total number of component multinomials. In some embodiments, the component multinomials P(f|z) (sometimes referred to as "multinomial bases") for any speaker and their corresponding mixture weights $P_\tau(z)$ for each spectral vector may be estimated using an Expectation-Maximization (EM) algorithm or the like.

This additive sound model may be seen as a probabilistic latent semantic indexing (pLSI) model. Looking past its probabilistic formulation, however, it may be noted that P(f|z) represents a normalized spectrum. The set of all multinomials may thus be viewed as a dictionary of spectral bases, with Equation 2 representing an algebraic decomposition and M representing the rank of decomposition. Meanwhile, $P_\tau(z)$ may be seen as weights that indicate how to put the dictionary elements together to approximate the input at hand. Accordingly, Equation 2 may be written as:

$$X_\tau(f) \approx \hat{X}_\tau(f) = g_\tau \sum_z^M P(f|z) P_\tau(z) \quad \text{Equation 3}$$

where $$g_\tau = \sum_f X_\tau(f).$$

The scalar $g_\tau$ aims to ensure that the eventual approximation is scaled appropriately to match the input. This may also be thought of as a non-negative matrix factorization in which $P(f|z)$ and $P_\tau(z)$ correspond to the two non-negative factors.

At this point, two observations allow extraction of $y^a(t)$ and $y^b(t)$ from m(t). The first one is that, in general, it will hold that:

$$M_\tau(f) \approx Y_\tau^a(f) + Y_\tau^b(f) \quad \text{Equation 4}$$

This means that the magnitude spectrogram of the mixture of the two sources is approximately equal to the sum of the magnitude spectrograms of the two sources. Although due to phase cancellations it may be difficult to achieve exact equality, this assumption is largely correct in most practical applications.

The second observation is that the multinomial bases $P^a(f|z)$, which may be estimated from $X_\tau^a$, may describe $Y_\tau^a$ better than the bases $P^b(f|z)$ estimated from $X_\tau^b$ and vice-versa. That is $$D_{KL}\left(\frac{Y_\tau^a}{g_r} \| \sum_z^M P^a(f|z) P_\tau(z)\right) < \left| D_{KL}\left(\frac{Y_\tau^a}{g_r} \| \sum_z^M P^b(f|z) P_\tau(z)\right) \right| \quad \text{Equation 5}$$

and vice-versa. In the foregoing equation, $D_{KL}(.)$ denotes the Kullback-Leibler divergence, $P^a(f|z)$ and $P^b(f|z)$ are the dictionaries learned from $x^a$ and $x^b$, and each $P_\tau(z)$ is the optimal weight distribution for approximating $Y_\tau^a$ given each of the two dictionaries.

These two observations indicate that the sound mixture $M_\tau(f)$ may be explained using both dictionaries $P^a(f|z)$ and $P^b(f|z)$:

$$M_\tau(f) \approx g_\tau P_\tau(a) \sum_z^M P^a(f|z) P_\tau(z) + g_\tau P_\tau(b) \sum_z^M P^b(f|z) P_\tau(z). \quad \text{Equation 6}$$

for two optimally selected instances of $P_\tau(z)$. Moreover, most of the energy of each source is represented by the part of this summation that includes the multinomial bases for that source.

In some embodiments, for both dictionary learning and weight estimation, an EM algorithm or the like may be used to estimate quantities in the above equations. In other embodiments, however, other algorithms may be used. Applying the EM algorithm, for instance, yields the following "update equations" for any dictionary element $P(f|z)$ and its corresponding weight $P_\tau(z)$ for an input $X_\tau(f)$:

$$P_\tau(z) = \frac{\sum_f P_\tau(z|f) X_\tau(f)}{\sum_{z',f} P_\tau(z'|f) X_\tau(f)} \quad \text{Equation 7}$$

$$P(f|z) = \frac{\sum_\tau P_\tau(z|f) X_\tau(f)}{\sum_{z',f,\tau} P_\tau(z'|f) X_\tau(f)} \quad \text{Equation 8}$$

where $$P_\tau(z|f) = \frac{P_\tau(z) P(f|z)}{\sum_{z'} P_\tau(z') P(f|z')} \quad \text{Equation 9}$$

In some embodiments, the dictionary of multinomial bases for each of the sources may be learned from separate training data during a training process. These dictionaries may then be used, for example, to decompose mixed recordings (i.e., to find the mixture weights $P_\tau(z)$ for all bases). Once the decomposition in Equation 6 is achieved, $Y_\tau^a|$ and $Y_\tau^b(f)$ may be separated recomposed and reverted back to the time domain to obtain separated estimates of $y^a(t)$ and $y^b(t)$.

Some of the systems and methods described herein are capable to apply direct recognition using the same additive sound model described above (as opposed to separating and then recognizing). To that end, the foregoing model may be incorporated into a Markov Selection Model described in the following section.

The Markov Selection Model

Model Definition

This section introduces an application of the model and observations described in the previous section as applied on temporal data. A Hidden Markov Model (HMM) is a doubly stochastic model comprising an underlying Markov chain and observation probability densities at each state in the chain. Parameters characterizing the model include:

(a) "initial state probabilities" $\Pi = \{P(s) \forall s\}$, which represent the probabilities of beginning a Markov chain at each state;

(b) a "transition matrix" $T = \{P(s_i|s_j) \forall s_i, s_j\}$; which represents the set of all transition probabilities between every pair of states; and (c) a set of "state output distributions"$^B = \{P(x|s) \forall s\}$, which represents the probability of generating observations from each of the states.

Figure 3A:
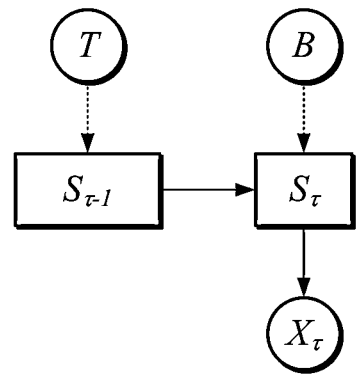
FIGS. 3A and 3B are graphical representations of an Hidden Markov Model (HMM) and a Markov Selection Model, respectively, according to some embodiments.

A graphical representation for this model is shown in FIG. 3A, where the state at each time is dependent on the state at the previous time and generates the observation (dotted arrows indicate injection of parameters).

Figure 3B:
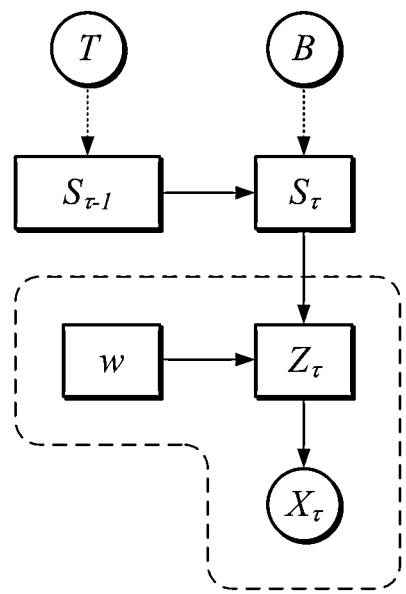

FIG. 3B shows a graphical representation for a Markov Selection Model according to some embodiments. In contrast with a regular HMM model, here instead of states generating observations directly, they may generate labels $z_s = \{z\}$ of sets of multinomial bases that produce observations. Thus, the output distributions of the Markov Selection Model may be given by: $B = \{P(z_s|s) \forall s\}$. Also, to generate observations, the multinomial bases in $z_s$ may be "mixed" according to weights $w_z$ (This additional dependence is highlighted by the dotted outline). The vector of weights for all bases, w, which actually represents a multinomial over z, may be drawn from a distribution that may be assumed to be uniform. In some embodiments, only the bases selected by the state (and their weights, appropriately normalized using any suitable normalization function) may be used to generate a final observation. Because the underlying Markov process contributes to data generation primarily by selecting bases, this model is referred to as the Markov Selection Model.

Figure 4:
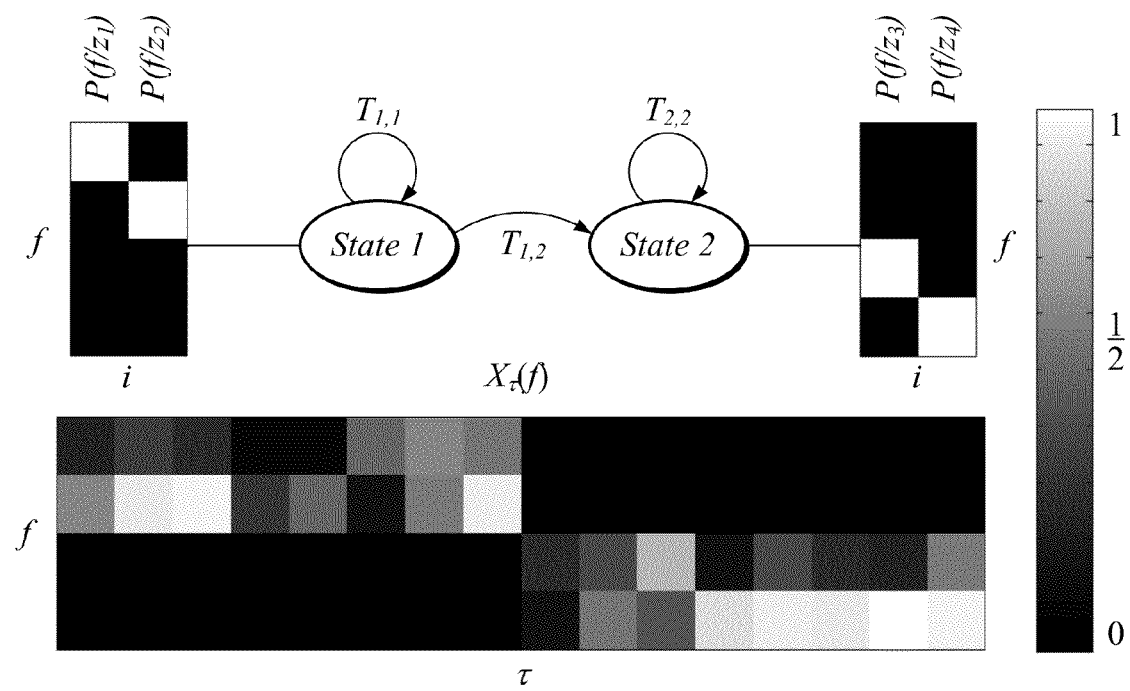
FIG. 4 is a graphical representation of a two state, left-to-right Markov Selection Model according to some embodiments.

Referring now to FIG. 4, a two state, left-to-right Markov Selection Model is depicted according to some embodiments. As illustrated, each state (1 and 2) may select one pair of multinomial bases. The two bases or dictionaries that describe each state are shown left and right as $P(f|z_i)$. The bottom of the figure displays the input spectrogram $X_\tau(f)$ that this model describes; the left part being described as a mixture of spectral vectors $P(f|z_1)$ and $P(f|z_2)$ and the right part by spectral vectors $P(f|z_3)$ and $P(f|z_4)$. The graph also shows initial state probabilities ranging from 0 to 1.

In some embodiments, the weights $w_z$ are not fixed but may themselves be drawn for every observation. Further, the draw of the weights themselves may not be dependent on the state in any manner, but may instead be independent. The actual probability of an observation may depend on the mixture weights. In some embodiments, in order to compute the complete likelihood of an observation the product of the weight-dependent likelihood of the observation and the probability of drawing the mixture weight vector may be integrated over the entire probability simplex on which w resides.

The Markov Selection Model may be used, for example, for inferring an underlying state sequence. To do so, it may be sufficient to determine the Markov-chain-independent a posteriori probabilities $P_{ind}(s|x)|$ of the states, and utilize those probabilities for estimating the state sequence. In some embodiments, the actual observation probability $P(x|s)$ is not required. Indeed, this observation may also be utilized in other approaches to HMM-based speech recognition systems where the Markov-chain-independent a posteriori probabilities of states are obtained through models such as Neural Networks or the like for inference of the underlying word sequence.

In some embodiments, instead of explicitly integrating over the space of all weights to obtain the likelihood of the observation, the Markov-chain-independent a posteriori state probability may be used for inference and learning of Markov chain parameters. Then, the a posteriori state probability may be approximated by the sum of a posteriori most likely mixture weights for the multinomial bases selected by any state. As such, the following approximation may be used:

$$P(z|X_\tau) \approx \hat{P}(z|X_\tau) = \arg\max_{z'} P(z'|x) = P_\tau(z) \quad \text{Equation 10}$$

$$P_{ind}(s|x) = \sum_{x \in z_s} \hat{P}(z|X_\tau) = \sum_{x \in z_s} P_\tau(z) \quad \text{Equation 11}$$

where $P_\tau(z)$ is the same value referred to in Equation 8.

In other words, the mixture weights that maximize the likelihood of the portion of the graph enclosed by the dashed outline of the Markov Selection Model of FIG. 3B may be derived. This may be achieved without reference to the Markov chain, and utilized to compute the Markov-chain-independent conditional probabilities for states, which in turn may be used in the inference, and which effectively factors the observation dependency and the state dependency of the model.

A consequence of this approximation is that the Markov Selection Model of FIG. 3B may be factored in two parts or components. The first component (enclosed by the dashed outline) may be seen as a probabilistic latent semantic analysis (pLSA) model that obtains $w_{m,l}$ and thereby $P_\tau(z)$. The second component, given the $P_\tau(z)$ computed from the first part, may be seen as an HMM with $P_\tau(z_z)$ as state output densities. In some embodiments, inference and learning may run largely independently in the two components, with the pLSA component employed to learn its parameters, while the HMM component may use a Baum-Welch training procedure or the like to learn the Markov chain parameters $\Pi|$l and T, for example. Then, both components may be combined for learning multinomial bases P(f|z).

Parameter Estimation

In some embodiments, a training method or algorithm may be used to derive parameters for the Markov Selection Model. For example, this method may be performed by adapting a Baum-Welch training procedure or the like. Specifically, in a first operation the "emission" probability terms for each state are computed. Because this is locally also a maximum likelihood estimate, an intermediate value of the optimal weight vector may be given by:

$$P_\tau(z|f) = \frac{P_\tau(z)P(f|z)}{\sum_{z'} P_\tau(z')P(f|z')} \quad \text{Equation 12}$$

$$P_\tau(z) = \frac{\sum_f P_\tau(z|f)X_\tau(f)}{\sum_{f,z'} P_\tau(z'|f)X_\tau(f)} \quad \text{Equation 13}$$

It may be noted that the above estimation does not refer to the underlying Markov chain or its states. Instead, these computations are local to the components within the dotted outline of FIG. 3B. Once $P_\tau(z)$ has been obtained, the posterior state probability $P(s|X_\tau)=P_\tau(z_s)$ may be computed using Equation 11.

In some embodiments, a forward-backward algorithm may then be employed as in conventional HMM modeling. Forward probabilities a, backward probabilities fl and state posteriors v are given by the recursions:

$$\alpha_\tau(s) = \sum_{s'} \alpha_{\tau-1}(s')T_{s,s'}P_\tau(z_s) \quad \text{Equation 14}$$

$$\beta_\tau(s) = \sum_{s'} \beta_{\tau+1}(s')T_{s,s'}P_{\tau+1}(z_{s'})$$

$$\gamma_\tau(s) = \frac{\alpha_\tau(s)\beta_\tau(s)}{\sum_{s'} \alpha_\tau(s')\beta_\tau(s')}.$$

In a maximization operation, all dictionary elements P(f|z, i) may be estimated. To that end, state posteriors may be used to appropriately weigh Equation 8 and obtain:

$$P(f|z) = \frac{\sum_\tau \sum_{s:z \in z_s} \gamma_\tau(s)P_\tau(z|f)X_\tau(f)}{\sum_{\tau,z',s':z \in z_{s'}} \gamma_\tau(s')P_\tau(z'|f)X_\tau(f)} \quad \text{Equation 15}$$

Here, "$s:z \in z_s$" represents the set of states which can select basis z. Update rules for transition matrix T and the initial state probabilities may be the same as with traditional HMM models.

It should be noted that, in some cases, strong local optima may cause convergence towards a poor solution during training. This may happen, for example, when the multinomial bases for the terminal state adapt faster towards explaining the first few input time points. One way to avoid this problem is to ensure that convergence of the dictionary elements is not too rapid so that there is a significant likelihood that dictionary elements across states may switch, if needed. In some embodiments, this may be achieved by imposing "anti-sparsity" prior to the activation of the dictionary elements. For example; a Dirichlet distribution or the like may be used over the mixture weights for all P(f|z) with hyper-parameters $a_j$ slowly transitioning from 1.5 to 1 during training. This may provide consistent results over multiple runs and avoid conversion on wrong local optima.

State Sequence Estimation

In some embodiments, a procedure for computing an optimal state sequence, given all model parameters may include, for each observation, computing the emission probability for each state through the EM estimation of Equations 13 and Equation 11. Then, a Viterbi algorithm or the like may be used to find the optimal state sequence as generally, known in the art.

Figure 5:
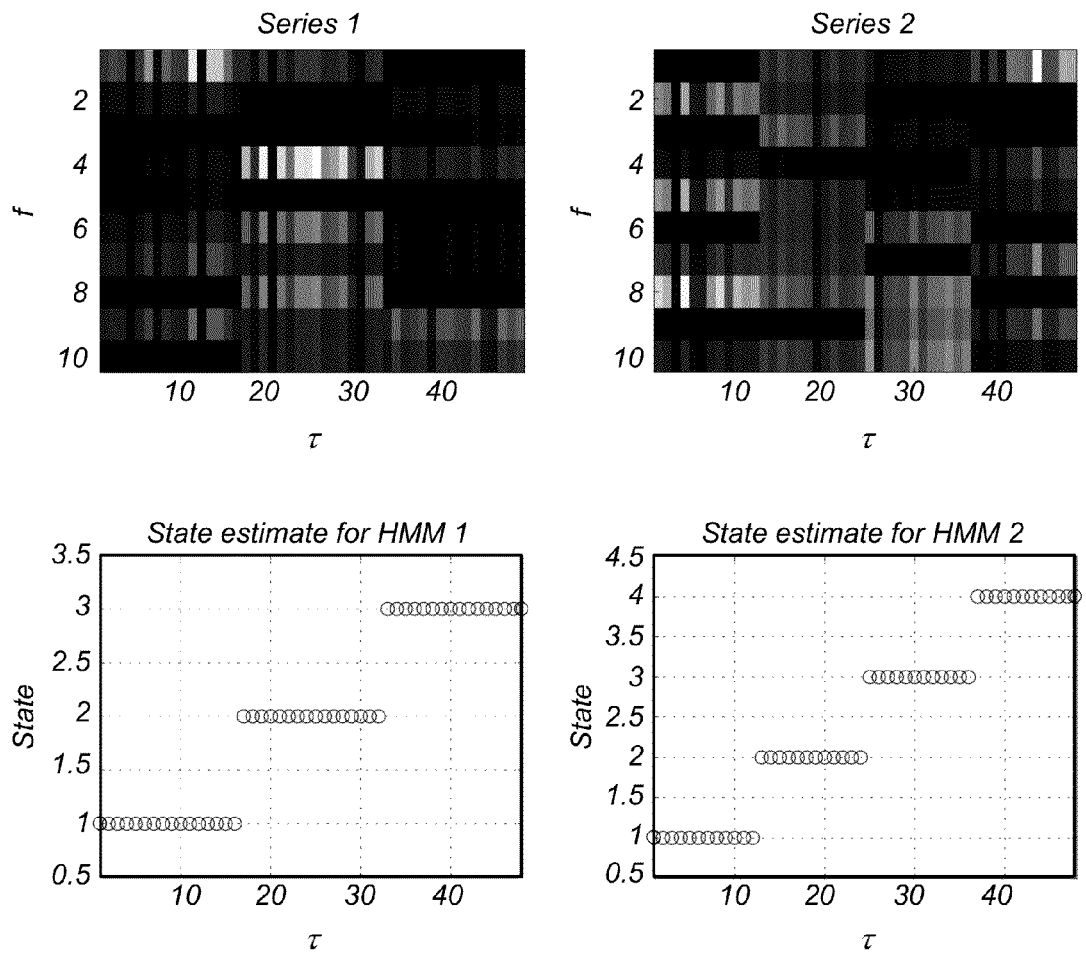
FIG. 5 are graphs of results obtained from learning and state sequence estimation operations for individual sounds according to some embodiments.

FIG. 5 shows two examples of results obtained from learning and state sequence estimation for individual sounds according to some embodiments. Particularly, FIG. 5 shows two spectrograms labeled "Series 1" and "Series 2," each spectrogram corresponding to a different sound. For each spectrogram shown, a three-state Markov Selection Model of the proposed architecture is learned. An optimal state sequence for each data sequence using the model estimated from it is then obtained. These state segmentations are shown in the bottom plots of FIG. 5 for each of Series 1 and 2. These results indicate that the segmentation is intuitive insofar as each of the states captures a locally consistent region of the data.

Modeling Mixtures of Signals

The Markov Selection Model introduced above may be used, for example, to analyze the sum of the output of two separate processes. For instance, let $X_\tau^a(f)$ and $X_\tau^b(f)$ be two data sequences obtained separately from two sources that are well modeled by the Markov Selection Model. Also, let the actual observation be such that $X_\tau(f)=X_\tau^a(f)+X_\tau^b(f)$. The resulting statistical model for $X_\tau(f)$ is then depicted in FIG. 6 according to some embodiments.

Figure 6:
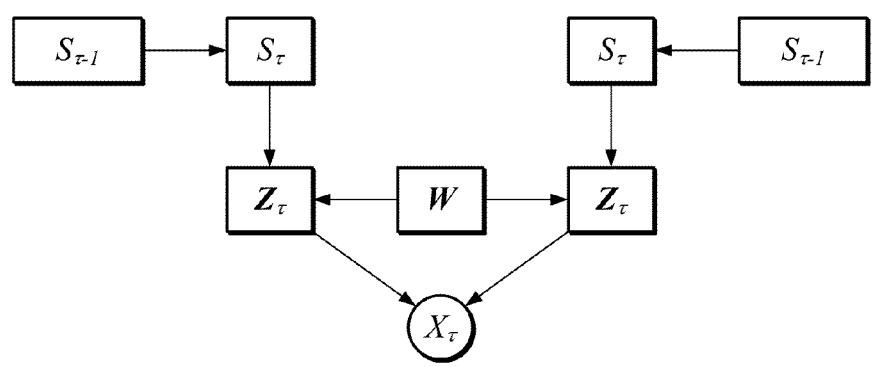
FIG. 6 is a diagram of a statistical model for $P_\tau(f)$ according to some embodiments.

As shown in FIG. 6, each of the two sources may follow its own independent Markov chain. The state output distributions for each source may be selector functions, as in the case of a single source. However, the summed data may be generated by an independent process that draws a mixture weight vector including mixture weights for all bases of both sources. The final observation may then be obtained by the mixing of the bases selected by the states of both of the sources using the drawn mixture weights.

To estimate state sequences for individual sources, the same approximations shown above may be used. First, optimal weights for all bases may be computed using iterations of Equation 13. These iterations may calculate the $P_\tau(z)$ for all bases from all sources. Once these are computed, the Markov-chain-independent a posteriori state probabilities for each of the states of the Markov models for both sources may be determined using Equation 11 as follows:

$$P(s \mid X_\tau^{(i)}) = \sum_{z \in z_s} P_\tau(z) \qquad \text{Equation 16}$$

where $X_\tau^{(i)}$ is the $i^{th}$ source at time step T, S is any state in the Markov model for the $i^{th}$ source and $z_s$ is the set of bases selected by the state.

Remarkably, the Markov Selection Model enables computation of the state emission probabilities for individual sources given only the sum of their outputs. The optimal state sequences for the individual source may be independently obtained, for example, using a Viterbi algorithm.

As a result, the complexity of this process, given K sources, each modeled by N states, is $O(KN^2)$, which is the equivalent of performing K independent Viterbi decodes. This is in contrast to conventional factorial approach to modeling the mixture of multiple sources, where the resulting model has NK states and the Viterbi estimation of the optimal state sequence requires $O(N^{2K})$ operations, typically requiring complex variational calculations.

Figure 7:
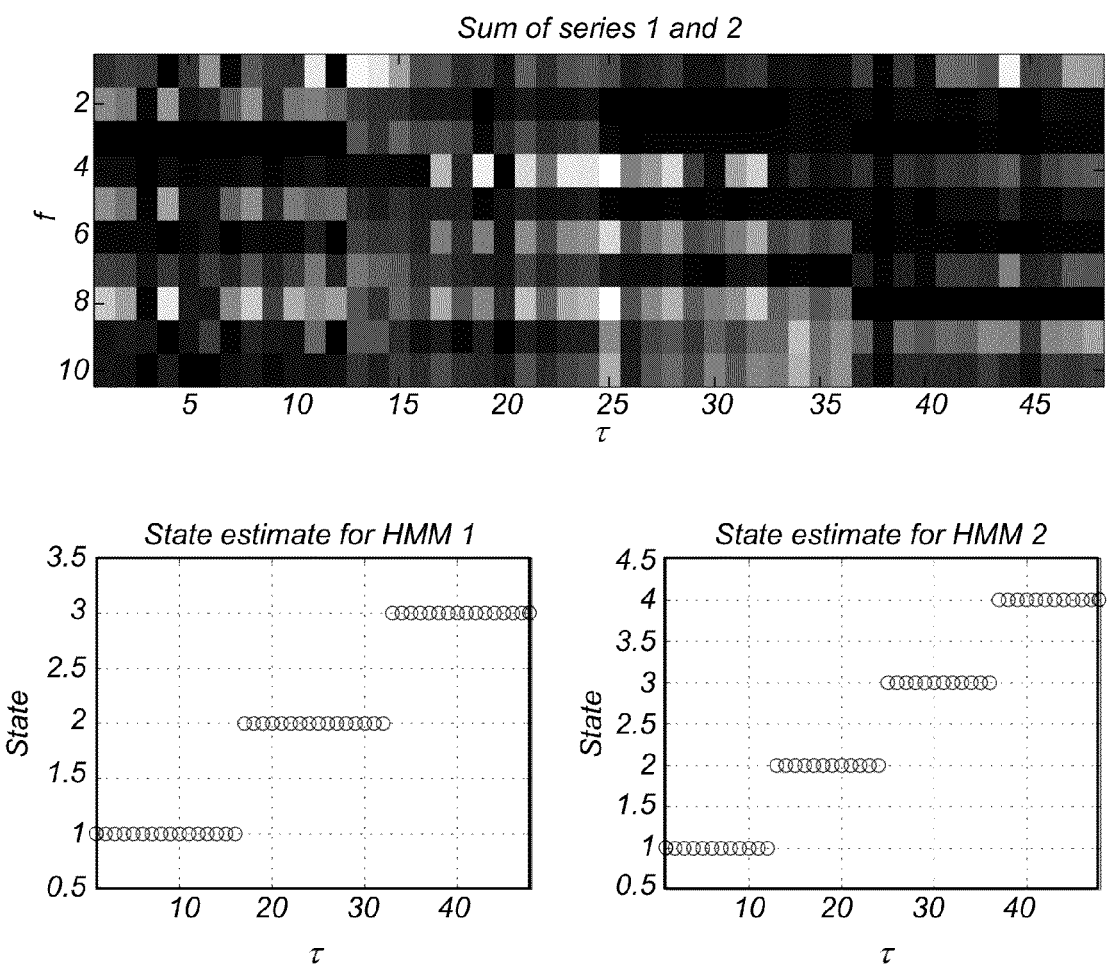
FIG. 7 are graphs of results obtained from learning and state sequence estimation operations for a sound mixture according to some embodiments.

FIG. 7 shows an example of results obtained from learning and state sequence estimation for a sound mixture according to some embodiments. The top plot is a spectrogram of a "mixed" data sequence composed as a sum of the two sequences of FIG. 5 (Series 1 and 2). Under a traditional approach, a factorial Markov model would have considered all twelve possible combinations between both models' states, and then would have obtained the most likely state paths using a 2-d Viterbi search. In contrast, using the Markov Selection Model described herein, individual emission scores for the states of the individual HMMs for every time instant as well as optimal state sequence may be obtained independently for each sound and/or source. The obtained state sequences are shown in the bottom plots of FIG. 7. It should be noted that these graphs are identical to the state sequences obtained from the isolated sequences in FIG. 5, which indicates that the Markov Selection Model may be successfully applied to sound mixtures.

Illustrative Methods

As described in the foregoing sections, the disclosed Markov Selection Model is capable of recognizing simultaneously emitted signals from different sources. The recognition may be performed without the need to separate signals or sources, thus reducing computational complexity and/or number of operations. At least in part because elements of the Markov Selection Model are added from state dictionaries to construct mixed signals, the mixture may be evaluated as components from different models. This is in contrast with conventional Markov-based approaches, where Gaussian functions describe all sounds and therefore cannot easily explain mixtures.

In some cases, the signals to be recognized may be human speech. In those cases, a Markov Selection Model may be trained for each utterance from each speaker. Each utterance may be a word or the like, and may contain a number of syllables or phonemes. To model each utterance, the parameters described by Equations 12 through 15 may be calculated in a training stage, for example, based on a spectrogram for each utterance. Each trained model may therefore have one or more state dictionaries, and each dictionary may have a two or more spectral vectors. Moreover, each utterance from each speaker may be represented by a linear combination of spectral vectors from each respective dictionary.

In some embodiments, the number of dictionaries for each model may be a function of the number of phonemes in a particular utterance. For example, if an utterance has n phonemes, a Markov Selection Model for that utterance may have 3n dictionaries. However, the number of dictionaries for each model may be determined in other ways. As another example, in some embodiments a human user may manually select the number of dictionaries for each utterance based on visual inspection of the utterance's spectrogram during the training stage.

In an application or evaluation stage, a sound mixture may be stored, received, or identified that contains sounds emitted by various sources such that they may at least partially overlap in time. For example, still referring to human speech, the sound mixture may contain certain words or phrases simultaneously spoken by different persons. In some embodiments, the model for each word or utterance will have been trained in an "offline" training stage using clean sounds. In other embodiments, models for each word or utterance may be trained "online"—e.g., using non-overlapping speech in the sound mixture itself. In yet other embodiments, the sound mixture may be pre-recorded or it may be a "live" event. Either way, the sound mixture may be represented by a spectrogram or the like.

Once the sound mixture is received, several (or all) dictionary vectors from available models may be combined to fit the mixture. Then weights may be calculated for each dictionary element or spectral vector using Equation 16 to estimate the likelihood that each model represents the utterances in question. In other words, once the weights for each spectral vector can be determined, Equation 16 provides the probability that a particular model was trained on a particular utterance. Again, this is in contrast with other Markov methods where no model is trained on the mixture itself, and therefore the likelihood of each model recognizing a mixed utterance would be very small.

For example, if it is known that the sound mixture includes speech from n speakers, the method may select the n models with highest likelihood of representation at a given time based on the calculated mixture weights. Moreover, once concurrent speech is recognized, speakers may be identified based on the models selected.

Figure 8:
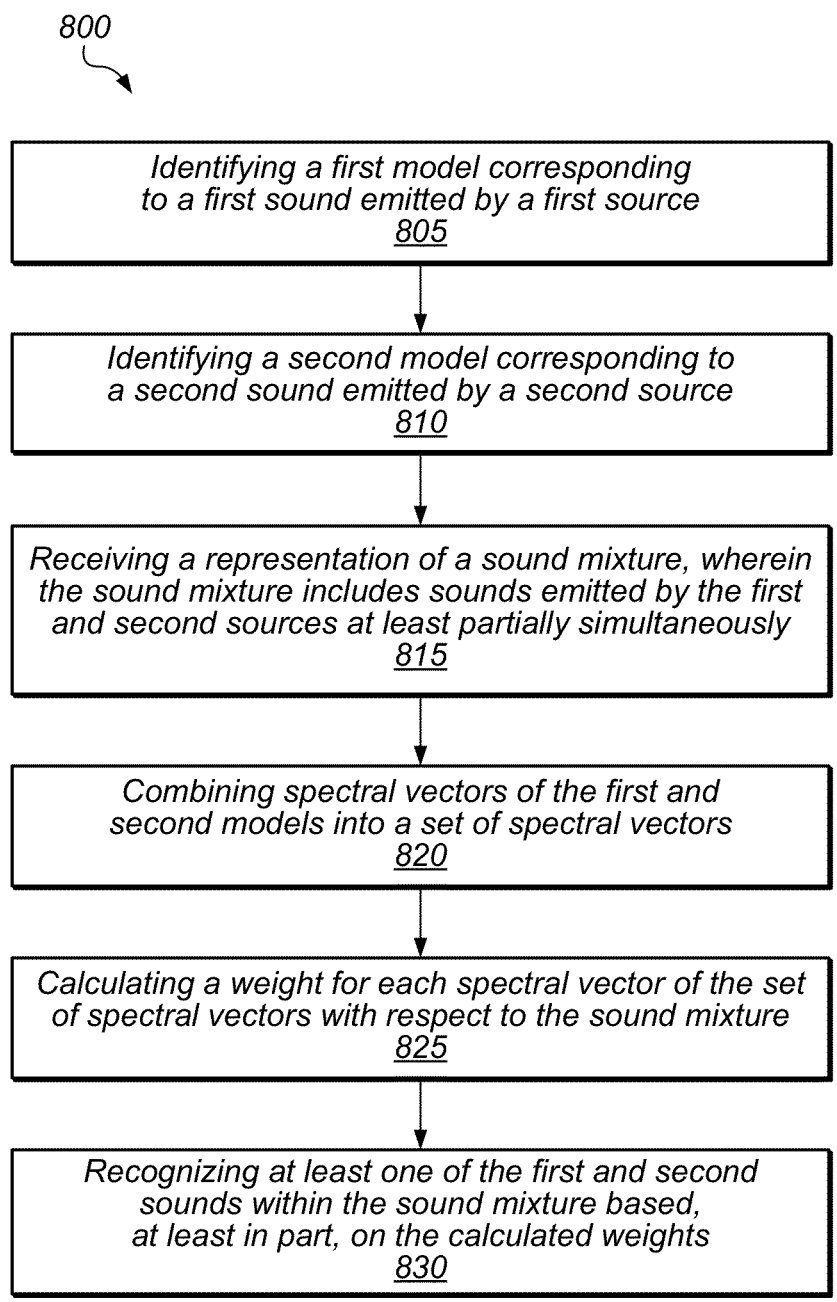
FIG. 8 is a flowchart of a method for recognizing concurrent sounds according to some embodiments.

Referring now to FIG. 8, a flowchart of a method for recognizing concurrent sounds is depicted according to some embodiments. At 805, method 800 may identify a first model corresponding to a first sound emitted by a first source. As noted above, the first model includes a first set of dictionaries and each dictionary includes a first set of spectral vectors. Similarly, at 810, method 800 may identify a second model corresponding to a second sound emitted by a second source, where the second model includes a second set of dictionaries and each dictionary includes a second set of spectral vectors. Then at 815, method 800 may receive a representation of a sound mixture. The sound mixture may include sounds emitted by the first and second sources at least partially simultaneously. At 820, method 800 may combine combining spectral vectors of the first and second models into a superset of spectral vectors, and at 825 method 800 may calculating a weight for each spectral vector of the superset of spectral vectors with respect to the sound mixture. At 830, method 800 may then identifies or recognizes at least one of the first and second sounds within the sound mixture based, at least in part, on the calculated weights.

For example, the first source may be a first utterance spoken by a first person and the second sound emitted by the second source may be a second utterance spoken by a second person. Notably, method 800 is capable of recognizing at least one of the first and second sounds within the sound mixture without separating those sounds. The recognition may be based, for example, upon a determination that a likelihood that the first model expresses the portion of the sound mixture is greater than a likelihood that the second model expresses the portion of the sound mixture. Although method 800 describes one model for each source, in other situations a single source may have a plurality of models. Further, the sound mixture may contain more than two concurrent sounds—e.g., three persons speaking at once. In this case, the sound mixture includes speech from 3 speakers, so the method may select the 3 models with highest likelihood of representation of the concurrent speech.

Figure 9:
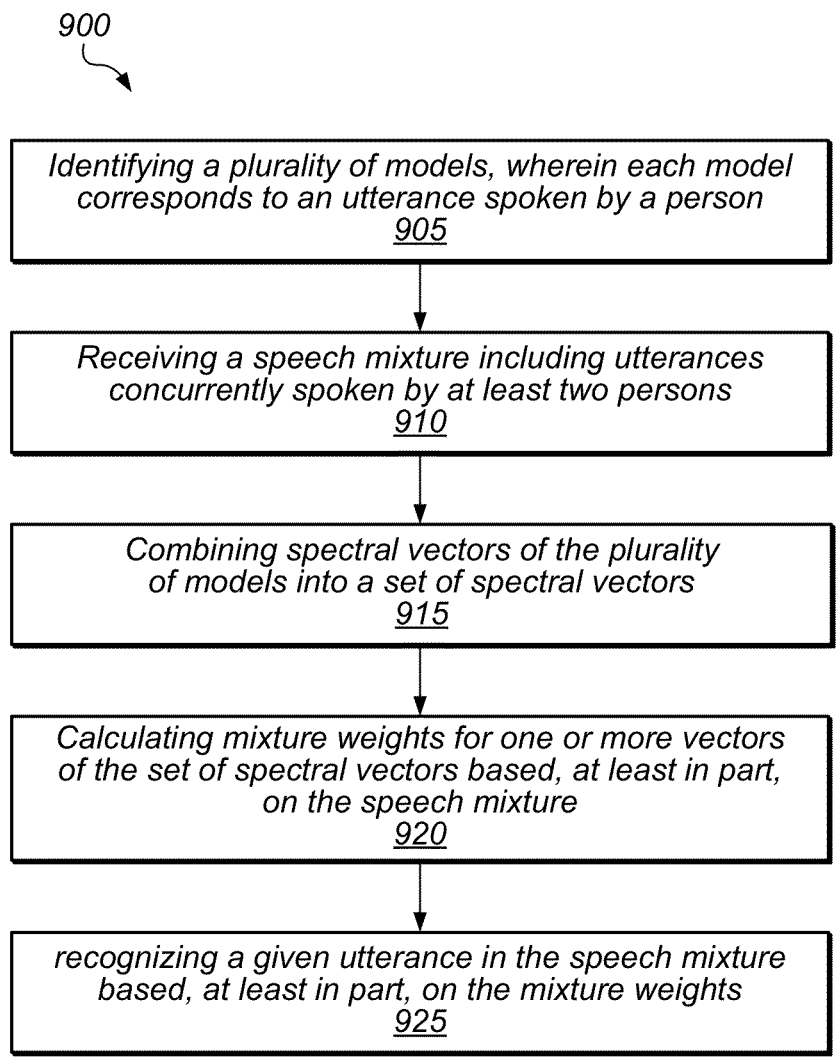
FIG. 9 is a flowchart of another method for recognizing concurrent sounds according to some embodiments.

Referring now to FIG. 9, a flowchart of another method for recognizing concurrent sounds is depicted according to some embodiments. At 905, method 900 identifies a plurality of Markov Selection Models, where each Model corresponds to an utterance spoken by a person. Then, at 910, method 900 receives a speech mixture including utterances concurrently spoken by at least two persons. At 915, method 900 combines spectral vectors of the plurality of models into a set of spectral vectors, and at 920 method 900 calculates mixture weights for one or more vectors of the set of spectral vectors based, at least in part, on the speech mixture. At 925, method 900 recognizes a concurrently spoken utterance in the speech mixture based, at least in part, on the mixture weights.

Referring now to FIG. 10, a flowchart of yet another method for recognizing concurrent sounds is depicted according to some embodiments. At 1005, method 1000 receives a sound mixture that includes a first sound emitted by a first source and a second sound emitted by a second source. Within the sound mixture, the first and second sounds may overlap in time, at least partially. Then at 1010, method 1000 recognizes the first sound within the sound mixture without separating the first sound from the second sound.

Experimental Results

This section presents experiments that demonstrate illustrative uses of the Markov Selection Model in speech recognition applications.

A Small Scale Experiment

Figure 11:
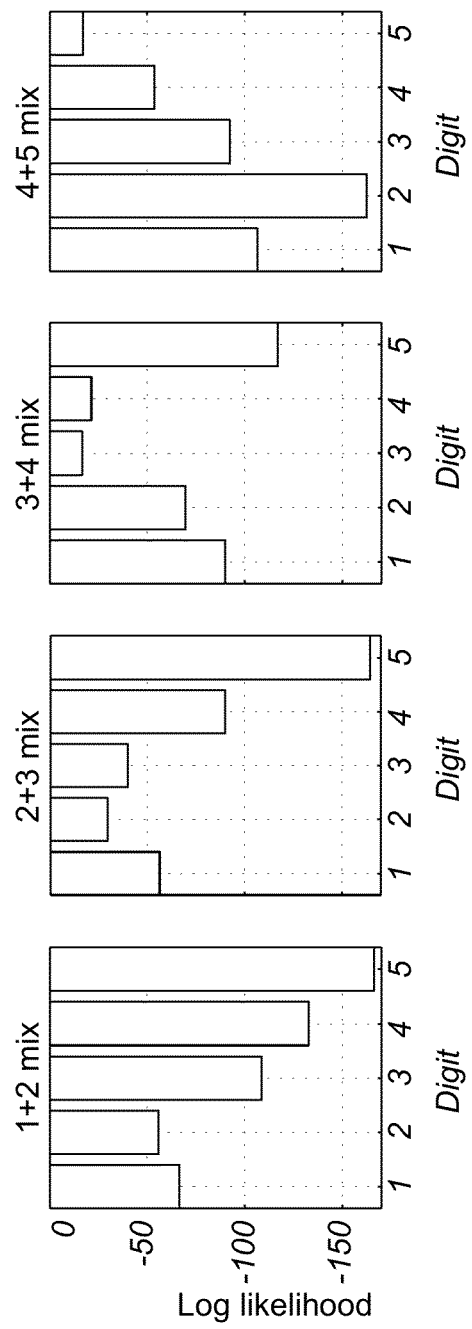
FIG. 11 are graphs showing results of experiments that illustrate the ability of the Markov Selection Model to discover sequences from speech mixtures according to some embodiments.

FIG. 11 shows results of an experiment using "digit" data to illustrate the ability of the Markov Selection Model to discover sequences from speech mixtures, according to some embodiments. During a training phase, ten utterances of five different digits (i.e., spoken numerals "one," "two," "three," "four," and "five") from a single speaker were chosen, and an instance of the proposed Markov model was derived for each digit. For sake of simplicity, each model was designed as having four states or dictionaries, and each dictionary had three frequency distributions or spectral vectors. Each separate digit included pre-emphasized magnitude spectra from roughly 45 ms windows. Then, an additional unknown or untrained utterance of each digit from the same speaker was used to construct a set of sound mixtures containing one digit each. The mixtures were analyzed using the pre-learned digit models and their estimated likelihoods examined in order to discover which utterances were spoken in the mixture. Example results are shown for four mixture cases in FIG. 11, each graph labeled "1+2 mix," "2+3 mix," "3+4 mix," and "4+5 mix." In this example, the log likelihoods of the spoken digits were significantly higher than the non-spoken digits, from which the contents of the recording may be deduced.

For example, the 1+2 mix graph indicates that models for digits 1 and 2 are identified as having the greatest likelihood (i.e., shortest bars) of representing utterances in a mixed signal containing the sounds "one" and "two." Similarly, the 2+3 mix graph indicates that models for digits 2 and 3 are identified as having the greatest likelihood of representing utterances in a mixed signal containing the sounds "two" and "three." In fact, the concurrently spoken sounds in all of the four sound mixtures were correctly recognized by the appropriate models.

A Large Scale Experiment

This section describes a large scale experiment using a speaker separation challenge data set provided by the University of Sheffield, UK. The data was composed of mixture recordings of two speakers simultaneously uttering sentences of a predefined structure. In a first experiment the Markov Selection Model was used to identify a specific word in the sentence uttered by the primary speaker, and in a second experiment the Markov Selection Model was used to recognize all words for both utterances.

The features used were magnitude spectral features. A time frame of about 30 ms and a frame advance of 15 ms were used. The magnitude spectra were preemphasized so that the higher frequency content was more pronounced. Similarly as described above, a Markov Selection Model was trained for each word and each speaker using the number of states guidelines provided by the dataset documentation. One frequency distribution was used per state, and each model was trained for 500 iterations.

The resulting models from each speaker were then combined to form a larger Markov model which can model an entire target sentence with equiprobable jumps between all candidate words at each section. For each mixture sentence the speaker identities were provided in advance and the two Markov Selection Models describing all the possible utterances were used to estimate the most likely state sequence for each speaker as described in the previous section. The results of these simulations are shown in Table I for the first experiment and in Table II for the second experiment.

TABLE I

| SNR | Same speaker | Same gender | Diff gender | Avg. | GHMM Avg. |
|---|---|---|---|---|---|
| 6 dB | 58.1% | 68.3% | 69.8% | 65.2% | 48.0% |
| 3 dB | 46.4% | 64.2% | 64.7% | 58.0% | 37.2% |
| 0 dB | 32.7% | 53.9% | 60.5% | 48.6% | 29.4% |
| −3 dB | 21.7% | 44.8% | 53.0% | 39.3% | 20.8% |
| −6 dB | 13.6% | 36.0% | 45.7% | 31.2% | 15.5% |
| −9 dB | 8.7% | 31.5% | 37.0% | 25.2% | 12.3% |

TABLE II

| SNR | Same speaker | | Same gender | | Diff gender | | Avg. | |
|---|---|---|---|---|---|---|---|---|
| Clean | N/A | | N/A | | N/A | | 88% | |
| 6 dB | 68% | 32% | 80% | 59% | 83% | 70% | 77% | 53% |
| 3 dB | 57% | 42% | 77% | 67% | 80% | 76% | 71% | 61% |
| 0 dB | 46% | 53% | 68% | 75% | 76% | 80% | 63% | 69% |
| −3 dB | 35% | 65% | 61% | 80% | 71% | 84% | 55% | 76% |
| −6 dB | 26% | 74% | 53% | 84% | 64% | 86% | 47% | 81% |
| −9 dB | 21% | 80% | 48% | 87% | 57% | 87% | 41% | 84% |

The SNR columns in the tables above describe the amplitude difference between the primary and the secondary speakers. As expected, the louder the primary speaker is, the better the results. The "Same speaker" columns show the results when the two utterances were recorded from the same speaker. This may be seen as presenting a worst case scenario, because the dictionary elements in the Markov Selection Models have maximal overlap and the state posterior probabilities may become unreliable. In fact, this case yields the lowest recognition results. The "Same gender" column describes the results when the two speakers were of the same gender. This is a somewhat better situation because there is less overlap between the state dictionary elements. Accordingly, the recognition results show some improvement. Finally, the best recognition results are obtained when the two speakers are of different gender, in which case there is a high likelihood that dictionary elements do not overlap significantly. The last two columns of Table I present the average results of the Markov Selection Model ("Avg.") as well as the average results obtained using the same representation and a Gaussian state HMM, while treating the secondary speaker as noise ("GMM Avg").

The overall results in both experiments rank high in terms of previously achieved results, and come at a significantly lower computational cost than other approaches due to efficient decoding schemes described herein. It should be noted that, in some embodiments, selecting the proper representation may involves trading off the ability to discriminate among sound sources and the ability to recognize their sounds. For example, a fine frequency resolution and linear amplitude scale may aid in discriminating the two speakers and it may facilitate the additivity assumption, but it may also impede recognition insofar as it may tend to highlight pitch and amplitude variances. In contrast, a speech recognition system may use a lower frequency resolution that tends to conceal pitch information but that maintains spectral shape. Such representation may also be used in the log amplitude domain so that subtle amplitude patterns may be easier to detect.

In some embodiments, as noted above, recognition using Markov Selection Models may be performed without performing source separation. In other embodiments, however, once the state transitions have been estimated from a mixture, its constituent sources may later be separated. As such, the systems and methods described herein present a significant computational improvement as compared to otherwise similarly employed factorial Markov models without deteriorating performance.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

What is claimed is:

1. A method implemented by one or more computer systems, the method comprising:
   receiving a mixed audio signal, the mixed audio signal including:
      one or more portions including audio signals emitted from respective ones of a plurality of sources; and
      at least one portion having audio signals concurrently emitted from the plurality of sources;
   deriving a plurality of parameters for each of the audio signals within the mixed audio signal, the plurality of parameters derived from one of the mixed audio signal or training data and including:
      initial state probabilities representing probabilities of beginning a Markov chain at each state in the Markov chain;
      a transition matrix representing a set of transition probabilities between pair of states in the Markov chain; and
      a set of state output distributions representing probabilities of generating observations from each of the states in the Markov chain;
   generating, from the parameters and independent of using a Gaussian function, a plurality of models that each contain one or more state dictionaries containing two or more spectral vectors, such that each of the plurality of sources is represented by one or more of the plurality of models;
   combining a plurality of the spectral vectors from the plurality of models into a set of spectral vectors representing the mixed audio signal;
   calculating mixture weights for each spectral vector in the set of spectral vectors;

calculating a likelihood that each one of the plurality of models emitted one or more audio signals in the mixed audio signal based at least in part on the set of spectral vectors representing the mixed audio signal; and selecting one or more models from the plurality of models with the highest calculated likelihood.

2. The method of claim 1, wherein deriving the plurality of parameters for each of the plurality of sources is performed without preprocessing the mixed audio signal by a separation algorithm.

3. The method of claim 1, wherein a number of dictionaries for each of the plurality of models is determined dependent, at least in part, on a number of phonemes within a corresponding said audio signal.

4. A non-transitory computer-readable storage medium storing program instructions that, when executed by one or more computer systems, the method cause the one or more computer systems to perform operations comprising:

receiving a mixed audio signal, the mixed audio signal including one or more portions of audio signals emitted from respective ones of a plurality of sources and at least one portion having audio signals concurrently emitted from the plurality of sources;

deriving a plurality of parameters for each of the audio signals within the mixed audio signal, the plurality of parameters derived from one of the mixed audio signal or training data and including:

initial state probabilities representing the probabilities of beginning a Markov chain at each state in the Markov chain;

a transition matrix representing the set of all transition probabilities between every pair of states in the Markov chain; and a set of state output distributions representing the probability of generating observations from each of the states in the Markov chain;

generating, from the parameters and independent of using a Gaussian function, a plurality of models that each contain one or more state dictionaries containing two or more spectral vectors, such that each of the plurality of sources is represented by one or more of the plurality of models;

combining a plurality of the spectral vectors from the plurality of models into a set of spectral vectors representing the mixed audio signal;

calculating mixture weights for each spectral vector in the set of spectral vectors; calculating a likelihood that each one of the plurality of models emitted a portion of one or more audio signals in the mixed audio signal based at least in part on the calculated mixture weights representing the mixed audio signal; and selecting one or more models from the plurality of models with the highest calculated likelihood.

5. The non-transitory computer-readable storage medium of claim 4, wherein the combining of the plurality of spectral vectors into the set of spectral vectors representing the mixed audio signal is performed without preprocessing the mixed audio signal by a separation algorithm.

6. A device, comprising:
at least one processor; and
a memory coupled to the at least one processor storing program instructions executable by the at least one processor to perform operations including:

receiving a mixed audio signal, the mixed audio signal including one or more portions of audio signals emitted from respective ones of a plurality of sources and at least one portion having audio signals concurrently emitted from the plurality of sources;

deriving a plurality of parameters for each of the audio signals within the mixed audio signal, the plurality of parameters derived from one of the mixed audio signal or training data and including:

initial state probabilities representing the probabilities of beginning a Markov chain at each state in the Markov chain;

a transition matrix representing the set of all transition probabilities between every pair of states in the Markov chain; and a set of state output distributions representing the probability of generating observations from each of the states in the Markov chain;

generating, from the parameters and independent of using a Gaussian function, a plurality of models that each contain one or more state dictionaries containing two or more spectral vectors, such that each of the plurality of sources is represented by one or more of the plurality of models;

combining a plurality of the spectral vectors from the plurality of models into a set of spectral vectors representing the mixed audio signal;

calculating mixture weights for each spectral vector in the set of spectral vectors;

calculating a likelihood that each one of the plurality of models emitted a portion of one or more audio signals in the mixed audio signal based at least in part on the calculated mixture weights representing the mixed audio signal; and selecting one or more models from the plurality of models with the highest calculated likelihood.

7. The device of claim 6, wherein the combining of the plurality of spectral vectors into the set of spectral vectors representing the mixed audio signal is performed without preprocessing the mixed audio signal by a separation algorithm.

8. The method of claim 1, further comprising identifying one or more sources based on the selected one or more models.

9. The non-transitory computer-readable storage medium of claim 4, further comprising identifying one or more sources based on the selected one or more models.

10. The non-transitory computer-readable storage medium of claim 4, wherein a number of dictionaries for each of the plurality of models is determined dependent, at least in part, on a number of phonemes within a corresponding audio signal.

11. The device of claim 6, further comprising identifying one or more sources based on the selected one or more models.

12. The device of claim 6, wherein a number of dictionaries for each of the plurality of models is determined dependent, at least in part, on a number of phonemes within a corresponding audio signal.

13. The method of claim 1, wherein the training data is derived from an offline training method performed prior to receiving the mixed audio signal.

14. The non-transitory computer-readable storage medium of claim 4, wherein the training data is derived from an offline training method performed prior to receiving the mixed audio signal.

15. The device of claim 6, wherein the training data is derived from an offline training method performed prior to receiving the mixed audio signal.

* * * * *